United States Patent [19]

Hugli et al.

[11] 4,131,020
[45] Dec. 26, 1978

[54] ACCELEROMETER

[75] Inventors: Hans W. Hugli; John M. Kubler, both of Bellevue, Wash.

[73] Assignee: Sundstrand Data Control, Inc., Redmond, Wash.

[21] Appl. No.: 702,382

[22] Filed: Jul. 6, 1976

[51] Int. Cl.² ............................................ G01P 15/08
[52] U.S. Cl. .................................................. 73/517 B
[58] Field of Search .................... 73/514, 515, 516 R, 73/517 R, 517 B; 324/154 PB; 308/15, 26, 2; 74/5 R, 5 SF

[56] References Cited

U.S. PATENT DOCUMENTS

| 2,882,034 | 4/1959 | Wuerth | 73/517 B X |
| 2,987,638 | 6/1961 | Lux | 308/2 R X |
| 3,035,450 | 5/1962 | Hardway | 73/514 X |
| 3,046,795 | 7/1962 | Wilkerson | 74/5 |
| 3,167,965 | 2/1965 | Peterson | 73/492 |
| 3,897,690 | 8/1975 | Hanson | 73/517 B |
| 3,948,107 | 4/1976 | Asmar et al. | 73/516 LM |

FOREIGN PATENT DOCUMENTS

259506  6/1949  Switzerland ........................ 324/154 PB

Primary Examiner—James J. Gill
Attorney, Agent, or Firm—Ted E. Killingsworth; Michael B. McMurry; William R. Peoples

[57] ABSTRACT

A one-piece support frame is used to support a pair of capacitor plates and a lightweight longitudinally reinforced pendulum having a paddle on one end. The paddle is positioned midway between the capacitor plates forming a pair of capacitors. Attached to the pendulum is an axle which in turn is supported between two flexures by means of jeweled pivoted bearings. The ends of the flexures are rigidly secured to the support frame, and a desired pressure of the bearings against the axle is maintained by means of adjustment screws. Also attached to the pendulum is a torque coil which interacts with a magnetic assembly, secured to the support frame, to restore the paddle to the midpoint between the capacitor plates when the pendulum has been subjected to an acceleration force. Secured to the support frame above and parallel to the pendulum is a thick film circuit board containing an integrated circuit and associated hybrid elements for applying time varying voltages to each capacitor so that the currents flowing through the capacitors can be used as a measure of the difference in capacitance due to deflection of the paddle. The circuitry also includes an output circuit having a servo-compensated network for applying a restoring current to the torque coil wherein the gain and frequency characteristics of the servo system are independent of an impedance used to measure the restoring current.

33 Claims, 14 Drawing Figures

ACCELEROMETER

CROSS REFERENCE TO RELATED APPLICATIONS

The subject matter of this application is related to the co-pending applications, Holdren et al, Ser. No. 702,781, filed July 6, 1976; and Holdren et al, Ser. No. 702,389, filed July 6, 1976.

BACKGROUND OF THE INVENTION

The invention relates to the field of accelerometers and more particularly, to servoed linear accelerometers utilizing capacitance pick-off.

With the increasing use of accelerometers in small aircraft and missile navigation systems, as well as other applications requiring lightweight electronic systems, the reduction in size and weight in accelerometers has become increasingly important. In addition, accelerometers are frequently used in applications where they are subject to relatively severe physical shocks, vibration and radical temperature changes, all of which can affect the accuracy of the device. Thus, it is considered important to reduce the number of parts as well as reduce the weight and size of the assembly so that the effects of shock and temperature can be minimized.

Prior art servoed accelerometers also generally utilize a servo feedback circuit including a load resistance or other means to measure a current through a position restoring coil wherein the current is utilized as a measure of acceleration. However, the impedance of the load resistor can affect the servo loop gain of the feedback circuit and a change in the value of the load resistor can produce an unstable feedback loop or an undesirable frequency response of the system. Many of the prior art systems also measured the voltage across a position restoring coil instead of current which can lead to significant calibration errors due to a number of factors including the variability with temperature and current of the impedance of the force restoring coil. Another source of error or calibration difficulties with capacitive pick-off systems results from the common use of a fixed capacitor for comparison with a second variable capacitor comprised of an acceleration responsive pendulum and a capacitor plate wherein differences in capacitance between the fixed capacitor and the variable capacitor are used as a measure of acceleration. The use of such a fixed capacitor is subject to errors from stray capacitances from the accelerometer frame and housing, thus providing significant calibration difficulties. In addition, the prior art accelerometers that utilize capacitive pick-off techniques are structured with relatively large housings due to the relatively large capacitor plates used for measuring the deflection of the pendulum or proof mass. Along with the relatively large housings and associated mechanical components required by relatively large capacitors, prior art accelerometers typically require an expanded housing for containing associated electronics, or alternatively utilize a separate package for the associated electronics. Since prior art accelerometer systems are normally comprised of a force sensor and separate electronic circuits, they require the increased labor and installation costs associated with multipart assemblies along with additional electrical connections that provide potential sources of failure especially in hostile environments.

SUMMARY OF THE INVENTION

It is therefore an object of the invention to provide a servoed accelerometer having a one-piece support frame, enclosed within a housing, for supporting: a pendulum, a position detecting structure for detecting the positional response of the pendulum to acceleration, a restoring system for moving the pendulum to a predetermined location, a circuit board and an integrated circuit responsive to the position detecting structure for controlling the restoring mechanism.

It is another object of the invention to provide a servoed accelerometer having: a one-piece support frame hermetically sealed within a cylindrically shaped housing wherein a pendulum or seismic mass configured with a paddle at one end is rotatably secured by means of an axle and bearings to the support frame; a pair of capacitor plates secured to the frame and the paddle is inserted between the capacitor plates thus serving to measure the movement of the pendulum resulting from an acceleration force; a magnetic assembly which interacts with a torque coil secured to the pendulum so that the paddle can be restored to a predetermined position between the capacitor plates; a rectangular thick film circuit board secured to the support frame above and parallel to the pendulum which is utilized to support an integrated circuit that in turn is electronically connected to the capacitor plates and the torque coil thereby being effective to generate sufficient current in the torque coil to restore the paddle to a predetermined position when the pendulum has been deflected in response to an acceleration force.

It is an additional object of the invention to provide a servoed accelerometer having: a pair of capacitive plates, a pendulum or seismic mass including a paddle configured at one end wherein the paddle is located between the capacitor plates, and an axle secured to the pendulum wherein the axle is supported by a pair of flexures that in turn are secured at each end to a support structure along with a pair of adjusting screws for adjusting the force applied to the axle by the bearings.

It is a further object of the invention to provide a servoed accelerometer having a one-piece support frame, a pendulum or proof mass with a paddle configured on one end, a pair of capacitor plates secured to the support frame, an axle secured to the pendulum and supported by bearings which in turn are attached to two flexures that in turn are secured to the support frame.

It is still another object of the invention to provide a servoed accelerometer utilizing capacitive pick-off having a pair of capacitor plates cooperating with an acceleration responsive pendulum to provide a pair of capacitors having capacitances on the order of 2 picofarads wherein a time varying voltage is applied to the capacitors and the resulting difference in the current is utilized by a detector circuit to generate in a servo loop feedback circuit a sufficient current in a torque coil to move the pendulum to the midpoint between the capacitor plates.

It is a further object of the invention to provide a servoed accelerometer having capacitive pick-off with a one-piece frame enclosed within a hermetically sealed housing wherein a current representing the difference in capacitance between two capacitors formed by a pair of capacitor plates and an acceleration responsive mass is used as an input to a servo loop compensating network that generates an output current representing acceleration such that the servo loop gain and frequency performance is independent of any load resistance or impedance that can be used for measuring the output current.

In order to provide a compact assembly accelerometer having a minimum of parts and weight, a one-piece support frame is utilized which can be inserted and sealed within a cylindrical shaped housing. Attached to the one-piece frame is a pair of capacitor plates and a pendulum or seismic mass. The pendulum is attached to the support frame by means of an axle which is supported by a pair of bearings attached to a pair of flexures that in turn are secured to the support frame. The axle rotating in the bearings allows the paddle to move between the capacitor plates in response to acceleration force. Also attached to the pendulum between the axle and the capacitor plates is a torque coil which interacts with a permanent magnet attached to the support frame for restoring the paddle to a predetermined position midway between the capacitor plates. The one-piece support frame, in addition to supporting the permanent magnet, also provides a magnetic circuit for the magnetic flux generated by the permanent magnet and the torque coil. A rectangular thick film circuit board is attached to the one-piece support structure above and parallel to the pendulum and capacitor plates. An integrated circuit, hybrid circuit elements and discrete circuit elements are located on the thick film circuit board along with connections for leads from the capacitor plates, pendulum and the torque coil. One particular advantage of this structure is that the mechanical portion, including the pendulum, may be adjusted and calibrated in connection with the circuit before insertion in the housing. After calibration, the one-piece frame including the circuit board is inserted into the cylindrical housing, and the housing is hermetically sealed. After sealing, the housing is evacuated and back-filled with an inert gas. In order to reduce the size of the accelerometer, the capacitor plates are of a very small size and in combination with the paddle provide a pair of capacitors with a capacitance on the order of 2 to 4 picofarads.

Since the capacitors are quite small and the deflection of the pendulum or paddle required to measure an acceleration force is very slight, resulting in a change in capacitance on the order of one-thousandth of a picofarad, special circuitry has to be utilized to measure the changes in such a small capacitance. This is accomplished by applying a time varying voltage where the increase in voltage is linearly related to time from the integrated circuit to each of the capacitors. The resulting difference in the current through the capacitors is measured by a differential detector circuit, the output of which is applied to a feedback circuit for generating a restoring current in the torque coil. The feedback circuit utilizes a servo compensating network that results in a restoring current and a servo feedback loop that is independent of any load resistance or impedance that may be used to measure the restoring current.

DETAILED DESCRIPTION OF THE INVENTION

Figure 1:
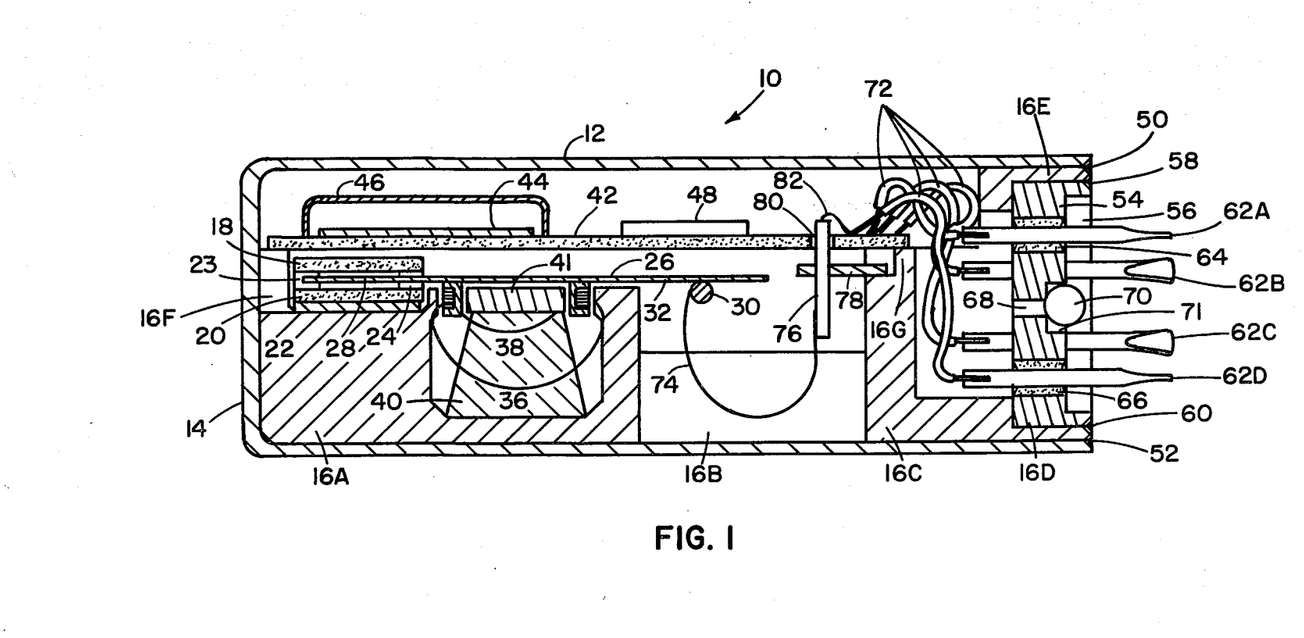
FIG. 1 is a longitudinal cross-section of a servoed accelerometer.

As illustrated in the cross-section drawing of an accelerometer 10 in FIG. 1 of the drawings, a one-piece cylindrical housing 12 is utilized to enclose both the mechanical structure and electronic circuitry of an accelerometer. The left-hand end 14 of the housing 12 is closed, and the right-hand side is open. A one-piece support frame, various portions of which are indicated by the reference numerals having a prefix 16 and letter suffixes such as 16A, 16B, 16C, etc., provides rigid structural support for the various components of the accelerometer illustrated in FIG. 1. The support frame extends from the left-hand end 14 of the housing to the open end and substantially fills the lower half of the housing 12 as indicated by the reference numerals 16A, 16B, 16C, and 16D. Located above portion 16A of the support structure are a pair of generally square or rectangularly shaped capacitor plates 18 and 20. The lower capacitor plate 20 is secured with a bonding substance such as epoxy to the portion 16A of the support frame by means of a spacer element 22. The upper capacitor plate 18 is in turn spaced apart from the lower plate 20 by means of a plurality of posts such as 23 and 24 secured to each corner of the capacitor plates.

Figure 2:
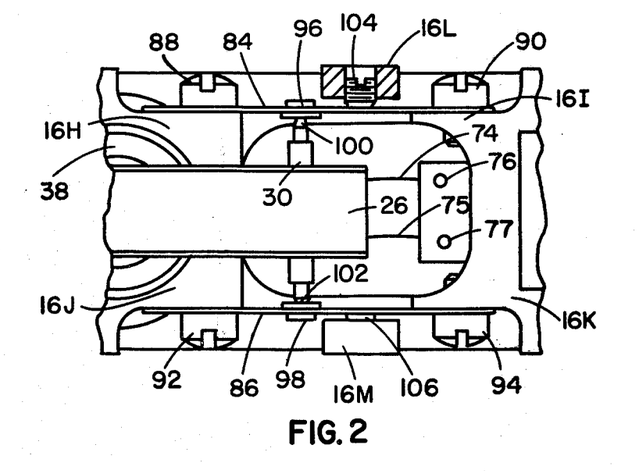
FIG. 2 is a top view of a portion of the accelerometer of FIG. 1 illustrating a pendulum support structure.
Figure 3:
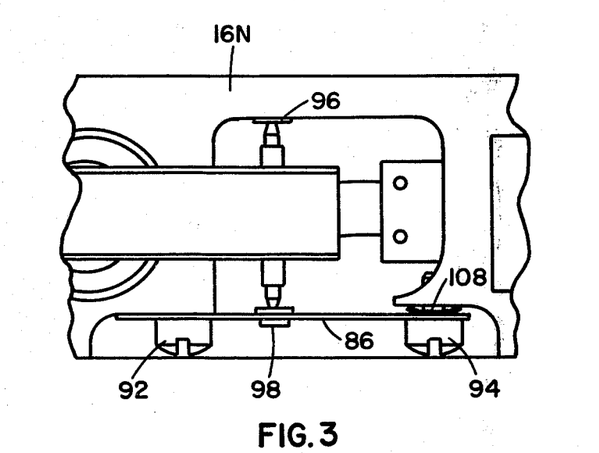
FIG. 3 is a top view of a portion of the accelerometer of FIG. 1 illustrating an alternate pendulum support structure.

Also included in the accelerometer of FIG. 1 is a pendulum indicated generally at 26. The pendulum 26 acts as a seismic or a proof mass and is responsive to acceleration forces acting in an upward or downward direction. The portion 28 of the pendulum 26 is configured into a flat plate or paddle and is inserted in a parallel relationship between the capacitor plates 18 and 20. In the preferred embodiment of the invention, the paddle 28 and the capacitor plates 18 and 20 are dimensioned with a width of approximately 0.25 inches (0.64 cm) and a length of 0.20 inches (0.51 cm) which will result in capacitances between the paddle 28 and the capacitor plates 18 and 20 of approximately 2 to 4 picofarads. Thus, when the paddle 28 is centered between the capacitor plates 18 and 20, the capacitance between each capacitor plate and the capacitor plate will be approximately 2 to 4 picofarads. At the other end of the pendulum beam 26 an axle 30 is bonded to the lower surface 32 of the pendulum 24 by means of bonding material such as epoxy. The axle 30 is utilized to support the pendulum 26 and to allow it to rotate to a limited extent in response to acceleration forces acting in a direction perpendicular to the surface of the paddle 28. The axle 30 itself is supported by means of bearings and flexures as illustrated in FIGS. 2 and 3 which have been left out of FIG. 1 for clarity of illustration. Also attached to the lower surface 32 of the pendulum 26 between the paddle 28 and the axle 30 is a torque coil indicated by the reference numeral 36. The torque coil 36 is wound inside a bobbin 38 that is preferably fabricated from a lightweight material such as aluminum. A free-standing coil can also be used without the need for the bobbin 38.

A permanent magnet 40 is bonded to the support structure 16A and a pole piece 41 is similarly bonded to the top of the permanent magnet 40. Magnetic flux generated by the permanent magnet 40 reacts with current flowing in the torque coil 36 and is effective to rotate the pendulum 26 about the axis 30. The one-piece support frame 16A, in addition to supporting the permanent magnet 40, also provides a magnetic circuit for the magnetic flux produced by the permanent magnet 40.

Secured to raised portions 16F and 16G of the one-piece support frame is a rectangular circuit board 42 which is preferably composed of thick film having a non-conducting substrate material such as aluminum oxide. The left-hand side of the circuit board 42 is supported by the upward extension 16F of the one-piece support frame and the right-hand side of the circuit board 42 is similarly supported by an upwardly extending portion 16G of the one-piece support frame. An integrated circuit 44 is enclosed by a metallic cover 46 on the upper surface of the circuit board 42. Also present on the circuit board 42 is a hybrid circuit along with a number of discrete electronic components such as resistors and capacitors indicated generally at 48.

The right-hand portion 16C of the one-piece support frame includes an annular cylindrical portion indicated in FIG. 1 by the reference numerals 16D and 16E, which fits securely within the interior radius of the housing 12. After assembly, the portions represented by 16D and 16E of the one-piece support frame are hermetically welded around the circumference of the housing 12 as shown at points 50 and 52 to form a gas-tight seal. Sealing the open end of the housing 12 is a header 54 having an annular recess 56 which is contained within the annular portion of the one-piece support frame indicated at 16D and 16E. The header 54 is also hermetically welded around the inner circumference of the support frame portions 16D and 16E as shown at points 58 and 60 to form a gas-tight seal. For some applications, it is not necessary to hermetically seal the housing 12 so that the header can be secured to the housing 12 by epoxy or other non-gas-tight materials. Extending through the header 54 are a plurality of connector pins including 62A, 62B, 62C and 62D, wherein a gas-tight seal is formed with the header 54 by means of a glass material shown at 64 and 66. The header 54 also includes an aperture 68 that can be used to evacuate air from the housing 12 and for back-filling the housing 12 with an inert gas after assembly. This aperture 68 can be sealed by a number of methods including welding an element such as a ball 70 to the outer end of the aperture 70 in an annular recess 71 of the header 54 as shown in FIG. 1. A plurality of leads indicated by the reference numeral 72 as shown in FIG. 1 are connected between pins 62A, 62B, 62C and 62D and the circuit board 42.

In order to electrically connect the torque coil 38 to the circuit board 42, a pair of springwire leads, one of which is shown at 74 of FIG. 1, is attached to the pendulum 26 at the axle 30. The wire 74 is attached to a pin 76 which in turn extends through a support member 78, composed of insulating material, and thence through a hole or aperture 80 in the circuit board 42. The second springwire and a second pin 77 as shown in FIG. 2 are similarly attached to the pendulum 26 and the circuit board 42 to provide a second connection for the torque coil 38. The pin 76 is then connected by means of a lead wire 82 to the circuit board 42. By utilizing the pins 76 and 77 extending through the apertures 80 in the circuit board 42 as shown in FIG. 1, assembly of the accelerometer is facilitated, since the board 42 can be positioned directly on the support portions 16F and 16G of the support frame and readily connected to the pin 76. By utilization of springwires 74 and 75 for the connection, the pendulum 26 can be finely balanced by applying a slight torque to the axle 30, thus compensating for small mechanical imbalances in the pendulum 26. The torque applied against the axle 30 can be adjusted by either bending the springwires 74 and 75 or by positioning the pins 76 and 77. The use of the connective structure including pins 76 and 77 and the aperture 80 allows for differing rates of thermal expansion of the support frame 16 and the circuit board 42 without disturbing the pin 76 and hence the tension or setting of the springwire 74.

A structure for supporting the axle 30 is illustrated in FIG. 2 of the drawings, which is a top view of a portion of the accelerometer 10 of FIG. 1 with the circuit board 42 removed. A pair of flexures 84 and 86 are secured to extensions 16H, 16I, 16J and 16K of the one-piece mounting frame by means of mounting screws 88, 90, 92 and 94, respectively. A pair of bearings 96 and 98 are attached to the flexures 84 and 86 and receive jeweled pivots 100 and 102 that are attached to each end of the axle 30. The bearings 96 and 98 serve to support the axle 30, thereby allowing the pendulum to rotate around the axle 30 while constraining the motion of the axle 30 in any other direction, and thus allowing the paddle 28 to move up and down between the capacitor plates 18 and 20 as shown in FIG. 1. In a high precision instrument such as the accelerometer shown in FIG. 1 it is extremely important that rotational friction be reduced to a minimum while at the same time rigid support is provided for the pendulum 28 so that lateral movement of the pendulum with respect to the support frame is eliminated insofar as possible. Therefore, for accurate calibration and performance, it is necessary that the optimum pressure be applied through the bearings to the jeweled pivots 100 and 102 so as to allow the minimization of rotational friction while maximizing lateral support. To this end, the accelerometer illustrated in FIG. 2 is provided with two adjustment screws, 104 and 106. The adjustment screws 104 and 106 are supported by integral extensions 16L and 16M of the one-piece support frame. The support portion of 16L has been sectioned in FIG. 2 to illustrate the position of the adjustment screw 104. By tightening the adjusting screws 104 and 106 on the flexures 84 and 86, the appropriate pressure can be applied against the flexures 84 and 86 resulting in the optimum pressure on the axle 30 by the bearings 96 and 98.

An alternate means of supporting the axle 30 of FIG. 1 is illustrated in FIG. 3. In FIG. 3 the one-piece support frame has a portion 16N that retains and supports the bearing 96 in a rigid position. The other bearing 98 is supported by the flexure 86 as in FIG. 2 with the exception that there is no adjustment screw 106. Adjusting the pressure on the axle 30 is accomplished in FIG. 3 by means of a springwasher 108 which compresses in response to a tightening of the mounting screw 94. As a result, by adjusting the single screw 94, the pressure on the axle 30 can be effectively regulated. It will be appreciated that a combination of the structures shown in FIG. 2 and FIG. 3 can be utilized, such as utilizing the adjustment screw 106 of FIG. 2 along with the fixed bearing 96 secured directly to the support portion 16N as shown in FIG. 3.

One important factor in adjusting the pressure on the axle 30 as shown in FIGS. 2 and 3 is the provision for the correct amount of deflection by the flexures 84 and 86 for a given pressure applied by the adjustment screws 104 and 106. In order to provide for a greater deflection of the flexures for a given pressure, it is often useful to include slots in the flexures. For example, in FIG. 4 the flexure 86 of FIGS. 2 and 3 is shown with two U-shaped slots 112 and 114 in the flexure 2. The U-shaped slots 112 and 114 are located on either side of a bearing 116. It should be noted that the bearings illustrated in FIGS. 2, 3 and 4 include a tapered internal surface 118 for receiving the pointed jeweled pivot 100 or 102 of the axle 30 as shown in FIGS. 2 and 3. In addition, the flexure in FIG. 4 contains holes 120 and 122 in each end for receiving the mounting screws 94 and 92. Alternate types of slots are shown in the flexures of FIGS. 5 and 6. In FIG. 5 there are a pair of slots 124, 126 and 128, 130 on each side of the bearing 116 wherein each slot is substantially perpendicular to the longitudinal axis of the flexure 86 and extends from the side to a point beyond the midpoint of the flexure. In FIG. 6 rectangular shaped slots 132 and 134 are located on each side of the bearing 116 on the flexure 86.

Figure 4:
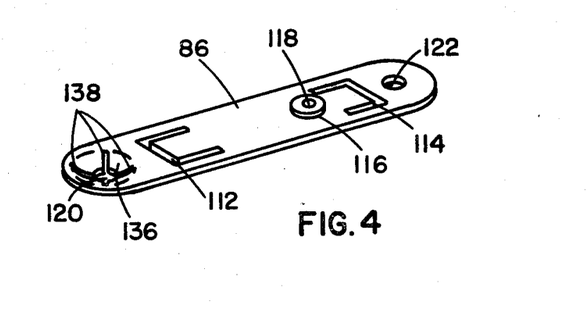
FIG. 4 is an illustration of a flexure member for use with the pendulum support structure of FIGS. 2 or 3.
Figure 5:
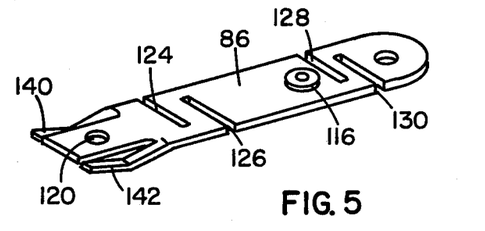
FIG. 5 is an alternate construction of a flexure member for use with the pendulum support structure of FIGS. 2 or 3.
Figure 6:
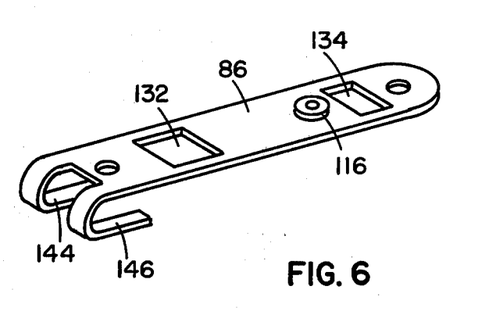
FIG. 6 is another alternate construction of a flexure member for use with a pendulum support structure of FIGS. 2 or 3.

The flexures of FIGS. 4, 5 and 6 also illustrate alternate means for connecting one end of the flexure 86 to the one-piece support frame 16N of FIG. 3 without utilizing the separate springwater 108 as shown in FIG. 3. In FIG. 4 the end of the flexure with hole 120 is configured with a cup-shaped portion 136 having a plurality of radial slots 138. In FIG. 5 the flexure 86 is configured with a pair of leafsprings 140 and 142 on either side of the mounting hole 120. The flexure 86 of FIG. 6 is configured with two extensions 144 and 146 that are bent over approximately 180° to form a spring. By utilizing the spring configuration 136, or 142, or 146 against the frame in connection with the mounting screw 94 in the assembly of FIG. 3 it is possible to adjust the pressure on the axle 30 without the requirement for a separate part such as the springwater 108.

Figure 7:
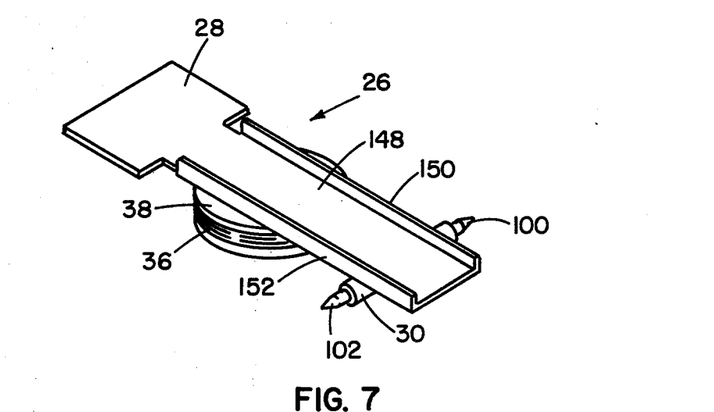
FIG. 7 is an illustration of a pendulum for use with the accelerometer of FIG. 1.
Figure 8:
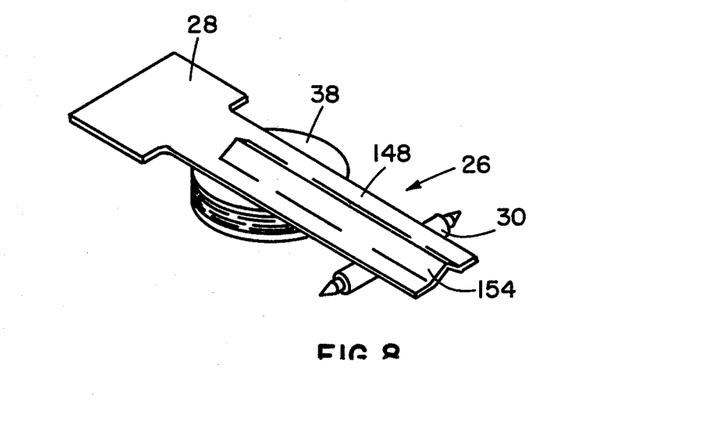
FIG. 8 is an illustration of an alternate pendulum for use with the accelerometer of FIG. 1.

In order to enhance the performance of the accelerometer 10 of FIG. 1, the pendulum assembly 26 should generally be of light weight, yet of rigid construction. For example, it is peferred that the pendulum 26 be constructed out of a relatively light metal such as aluminum. In addition, the pendulum 26 should be stiffened along its longitudinal axis. Two illustrations of means for providing longitudinal stiffness for the pendulum 26 are shown in FIGS. 7 and 8. As shown in FIG. 7, the pendulum assembly consists of the flat paddle portion 28 and a beam portion 148. Secured to the beam 148 of the pendulum 26 is the torque coil support or bobbin 38 which contains the torque coil 36. In FIG. 7 the beam 154 is longitudinally stiffened by means of two raised ridges, 150 and 152, along either side of the beam 148. In FIG. 8 the beam 148 is stiffened by means of a triangularly shaped ridge 154 configured out of the material of the beam 148. By stiffening the beam 148 of the pendulum 26 as shown in FIGS. 7 and 8 it is possible to provide a lightweight, yet longitudinally stiff pendulum for use in the lightweight servoed accelerometer 10 illustrated in FIG. 1. It is preferred that the main effect of the mass of the pendulum 27 be centered over the torque coil 36 while the mass of the other portions of the pendulum 26 such as the paddle 28 and the beam 148 be minimized.

Figure 9:
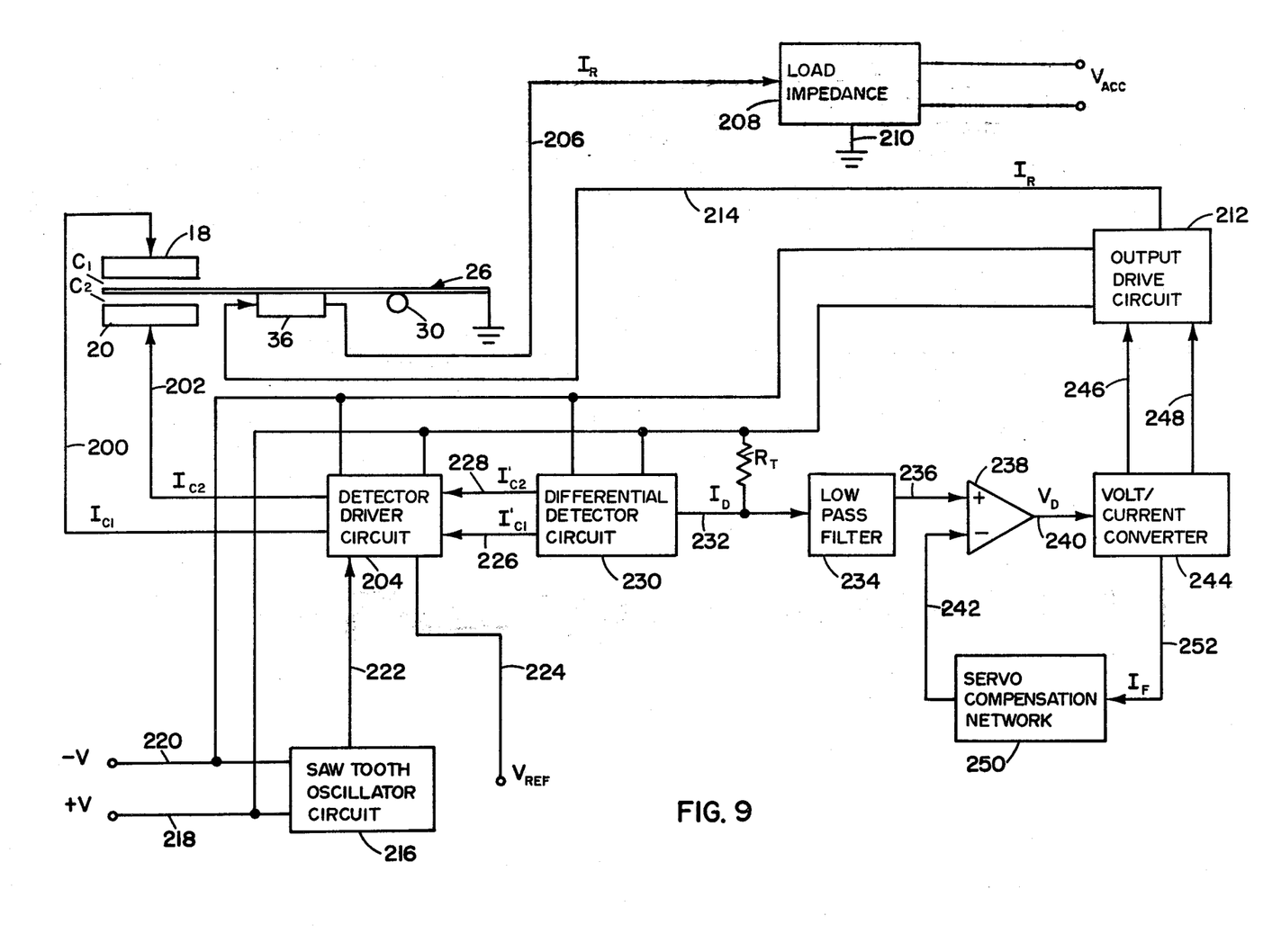
FIG. 9 is a block diagram of a circuit for use with the accelerometer of FIG. 1 for generating a signal representing acceleration.

A block diagram of the electronic circuit utilized with the accelerometer 10 is provided in FIG. 9. As shown in FIG. 9, the capacitor plates 18 and 20 of the accelerometer 10 of FIG. 1 are connected by means of lines 200 and 202 to a detector drive circuit 204. The torque coil 36, attached to pendulum 26, is electrically connected by means of line 206 to a load impedance 208, which in most applications is connected to a ground, as shown by line 210. The load impedance 208 receives the restoring current, $I_R$, which flows through the torque coil 36 and generates a voltage, $V_{ACC}$, across the load impedance that represents acceleration as measured by the accelerometer 10. Typically, the load impedance 208 will contain a resistor across which the voltage $V_{ACC}$ is measured, wherein the value of the resistor provides the desired scaling factor, normally denoted in Volts/g. Since the current $I_R$ flowing through torque coil 36 is a direct function of the acceleration being measured, by altering the value of the resistance in the load impedance 208, the desired scale factor, Volts/g, can be obtained by simply selecting the correct value for the resistance in the load impedance 208. The load impedance 208 may also include other reactive elements such as capacitors for filtering out undesired signals. The restoring current $I_R$ itself is generated in an output drive circuit 212 and applied to the torque coil 36 by means of line 214.

A saw-tooth oscillator circuit 216, connected to a positive supply voltage, $+V_S$, on line 218 and a negative supply voltage, $-V_S$, on line 220, applies a saw-tooth shaped waveform having a frequency on the order of 10 kilohertz to 1 megahertz to the detector driver circuit 204 over line to 1 222. The waveform generated by the saw-tooth oscillator circuit 216 includes a rising voltage which increases in a linear manner with time until the peak voltage is reached, whereupon the voltage drops very rapidly to a negative value. This saw-tooth waveform is applied by means of the detector driver circuit 204 to the capacitor plates 18 and 20 over lines 200 and 202. The time varying voltage thus applied to capacitor plates 18 and 20 will result in current flows $I_{C1}$ in line 200 and $I_{C2}$ in line 202. the detector driver circuit 204 also utilizes the supply voltages $+V_S$ and $-V_S$ as provided on lines 218 and 220 along with a reference voltage $V_{REF}$ as inputs to the detector driver circuit 204 over line 224. A schematic diagram of the detector driver circuit 204 is provided in FIG. 10.

Connected to the detector driver circuit 204 by means of lines 226 and 228 is a differential detector circuit 230. The detector driver circuit 204 draws currents $I'_{C1}$ and $I'_{C2}$ from the differential detector circuit 230 on the lines 226 and 228 which are generally similar to the capacitor currents $I_{C1}$ and $I_{C2}$. A schematic diagram of the differential detector circuit 230 is provided in FIG. 12 along with a detailed explanation of the circuit. The differential detector circuit 230 measures the difference between currents $I'_{C1}$ and $I'_{C2}$ which in turn represents the difference in capacitance between the capacitors $C_1$ and $C_2$ defined by plates 18 and 20 and the pendulum 26, and generates an output signal on line 232 that is proportional to the differences between the two currents. The output signal on line 232, represented by an output current or difference signal $I_D$, is utilized as input to a low pass filter 234. The principal function of the low pass filter 234 is to filter out the high frequency (10 kilohertz to 1 megahertz) carrier signal generated by the oscillator circuit 216. The DC components of the signal $I_D$, which represent the differences in capacitance between plates 18 and 20 and hence, deflection of the pendulum 26 due to acceleration, are transmitted by means of line 236 to the positive terminal of an operational amplifier 238. The operational amplifier 238 in effect converts the current signal $I_D$ into a voltage output $V_D$ on line 240 that represents the difference in the capacitance between capacitors $C_1$ and $C_2$ wherein the gain of output signal $V_D$ on 240 is controlled by a signal input to the negative terminal of operational amplifier 238 on line 242. Output or difference voltage $V_D$ is then applied to a voltage to current converter 244 that generates inputs on lines 246 or 248 to the output drive circuit 212. The output drive circuit 212 responds by generating the restoring current $I_R$ on line 214 in response to a current signal on line 246 or 248.

In addition, a servo compensation network 250 is connected in a feedback relationship between the voltage current converter 244 and the negative terminal of the operational amplifier 238. The basic purpose of the servo compensation network 250 is to control the gain of the operational amplifier 238 and hence affect gain servo systems as a whole as a function of the frequency of the output signal $I_D$. A schematic of a preferred embodiment of the servo compensation network is provided in FIG. 14. The servo compensation network 250 is essentially a band pass filter which, for example, permits virtually no feedback signal $I_F$ as received from the converter 244 from being applied to the negative terminal of operational amplifier 238 when $I_D$ and $V_D$ are essentially DC or have a very low frequency. As a result, the gain of the operational amplifier 238 will be very high for DC or low frequency outputs of the accelerometer. The effect of what is essentially infinite gain by operational amplifier 238 at low frequencies will be to stiffen the pendulum 26 with respect to the capacitor plates 18 and 20 for low frequency vibrations so that the pendulum is rigidly maintained within a predetermined position between plates 18 and 20. By using this very high gain for DC or low frequency vibration, errors and biases due to deflections or the inertia of the pendulum 26 are substantially reduced and the accuracy of the accelerometer is substantially improved. For higher vibrational frequencies, for example in the range of 50 Hz, the servo compensation network permits a relatively high feedback signal $I_F$ to be applied to the negative terminal of the operational amplifier 238, thereby reducing the gain of the amplifier. The gain of the operational amplifier 238 is reduced for these midband frequencies in order to prevent unstable operation of the servo loop due to effects of the mechanical dynamics of the accelerometer 10. For example, the natural frequency of the pendulum 26 would typically be in the range of these midband frequencies, which could result in unstable operation of the servo loop if the gain of the operational amplifier 238 were very high at these frequencies. Above the midband frequencies, the servo compensation network 250 will again reduce the amount of feedback $I_F$ applied to the negative terminal of the operational amplifier 238, thus tending to increase the gain of the amplifier 238. The gain of the operational amplifier 238 is increased at these higher frequencies in order to improve the response of the accelerometer 10 when it is subjected to relatively high frequency acceleration inputs where the mechanical dynamics of the accelerometer 10 are not a significant factor tending to create instability in the servo loop. The increase in gain will tend to compensate for the reduction in motion of the pendulum 26 at the higher vibrational frequencies. In addition, the servo compensation network 250 will eliminate the destabilizing effects of varying the load impedance 208 on the servo system of FIG. 9. Thus, it is possible, by utilizing the servo compensation network 250, to utilize a variety of load impedances, thereby facilitating the selection of a convenient voltage scale factor without having to recalibrate the electronics of the accelerometer 10.

In addition, the electronic circuit of FIG. 9 includes a trimming resistor $R_T$ connected between the positive voltage supply $+V_S$ on line 218 and the output line 232 of the detector circuit 230. By varying the value of resistor $R_T$, a bias voltage may be applied to the positive terminal of operational amplifier 238, which in turn has the effect of adjusting the null position of the pendulum 26 between the capacitor plates 18 and 20.

Figure 10:
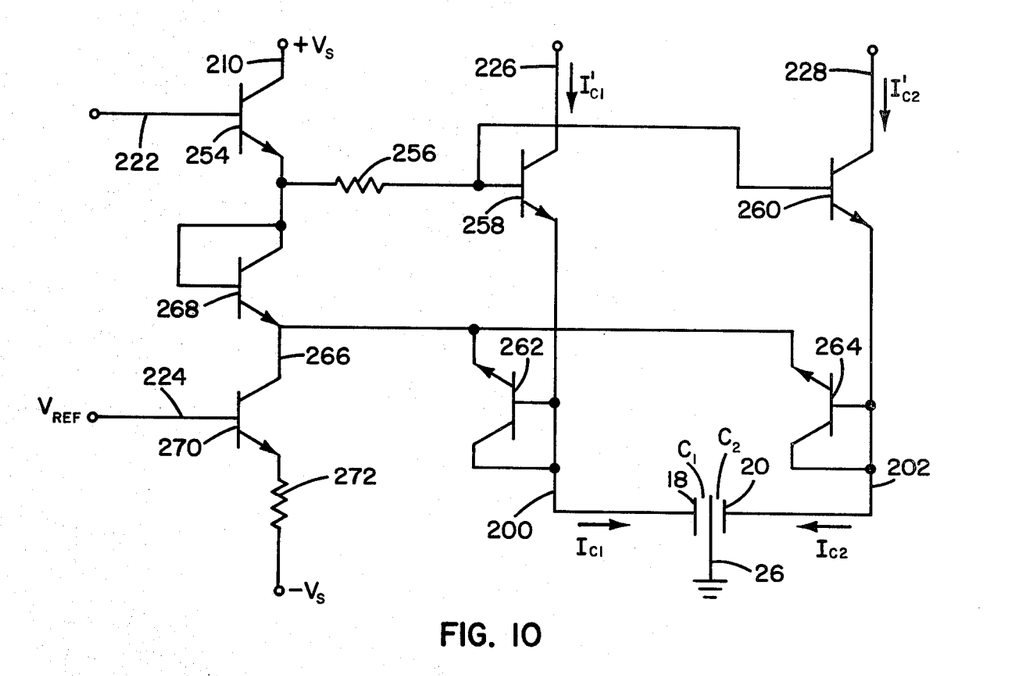
FIG. 10 is a schematic diagram of the detector driver circuit in the block diagram of FIG. 9.

In FIG. 10 of the drawings is illustrated a schematic diagram of the decector driver circuit 204. The saw-tooth waveform from the saw-tooth oscillator circuit 216 is applied over line 222 to the base of a transistor 256. One of the primary functions of the transistor 254 is to isolate the oscillator circuit 216 from the detector driver circuit 204. Connected to the emitter of transistor 254 through a resistor 256 are the bases of transistors 258 and 260. As an increasing voltage from oscillator 216 is applied to the base of transistor 254, the transistors 258 and 260 will be forward biased or switched on, thus tending to apply a similarly increasing voltage from lines 226 and 228 to capacitor plates 18 and 20, resulting in the currents $I_{C1}$ and $I_{C2}$. Also connected to the lines 200 and 202 are a pair of transistors 262 and 264. The transistors 262 and 264 serve as diodes and provide a current path for the discharge of the capacitor over line 266. An additional transistor 268 has its base and collector connected to the emitter of transistor 254 and its emitter connected to line 266. The transistor 268 thus serves as a diode in addition to biasing the emitters of transistors 262 and 264. A current cource or active load in the form of a transistor 270, resistor 272, the negative voltage source $-V_S$ and the reference voltage $V_{REF}$ on line 224 are connected to line 266.

Figure 11:
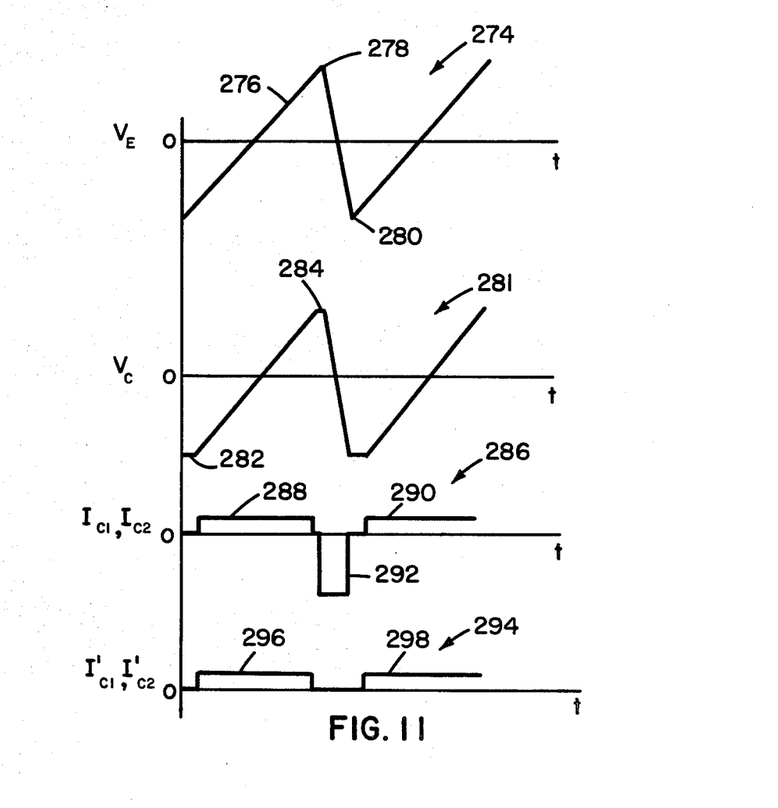
FIG. 11 is a signal chart for the detector driver circuit of FIG. 10.

The operation of the detector driver circuit 204 of FIG. 10 is illustrated by the signal chart of FIg. 11. In the upper portion of FIG. 11 the voltage waveform 274 represents the emitter voltage $V_E$ of transistors 258 and 260 of FIG. 10. The shape of the $V_E$ waveform 264 will be substantially the same as the saw-tooth voltage applied from the saw-tooth oscillator circuit 216 on line 222. As indicated in FIG. 11, the voltage $V_E$ increases linearly with time along slope 276 until it reaches a peak voltage at 278, where upon it drops rapidly to a negative voltage at 280. The waveform 281 of FIG. 11 represents the voltage $V_C$ that is applied to the capacitor plates 18 and 20. The capacitor voltage $V_C$ will initially remain constant, as shown at 282 of FIG. 11, until the transistors 258 and 260 are forward biased. After transistors 258 and 260 have become forward biased, the voltage $V_C$ will have the same characteristics as $V_E$. At the point 278 on waveform 274 where the voltage $V_E$ changes polarity, the capacitor voltage $V_C$ shown at 284 will remain constant until transistors 262 and 264 become forward biased, thus permitting the capacitors $C_1$ and $C_2$ to be discharged through line 266 to the active current source 270. Since there is a linear relationship between the capacitor voltage $V_C$ and time, the capacitor currents $E_{C1}$ and $I_{C2}$ can be represented by the following relationships:

$$I_{C1} = C_1 \frac{\Delta V_{c1}}{\Delta t}$$

$$I_{C2} = C_2 \frac{\Delta V_{c2}}{\Delta t}$$

Where $C_1$ and $C_2$ represent the capacitors formed by the capacitor plates 18 and 20 and pendulum 26 as shown in FIG. 10, and $V_{c1}$ and $V_{c2}$ represent the voltages across the individual capacitors. Thus, it can be seen that where there is a direct linear relationship between $V_C$ and time, the capacitor currents $I_{C1}$ and $I_{C2}$ will be constant. The nature of the capacitor currents $I_{C1}$ and $I_{C2}$ are illustrated in the waveform 286 of FIG. 11, where it can be seen that during the linear rise in capacitor voltage $V_C$ in waveform 281 the capacitor currents at 288 and 290 will be constant and flowing toward the capacitors C1 and C2, whereas during the drop in $V_C$ the capacitor currents will flow in the opposite direction as shown at 292. Due to the face that transistors 262 and 264 serve to direct the capacitor discharge currents as represented by 292 of FIg. 11 to the active load represented by transistor 270, the current inputs $I'_{C1}$ and $I'_{C2}$ as shown at 296 and 298 of waveform 294 to the detector driver circuit 204 on lines 226 and 228 will be of approximately the same magnitude and direction as the capacitor currents $I_{C1}$ and $I_{C2}$ but will not have the negative portion 292. Thus, the output currents $I'_{C1}$ and $I'_{C2}$ of the differential detector 230 of FIG. 9 on lines 226 and 228 will be in the nature of a series of single polarity pulses as shown by the waveform 294 of FIG. 11. It should be noted that the actual magnitude of the currents $I'_{C1}$ and $I'_{C2}$ will be proportional to the capacitances of the capacitors C1 and C2, respectively.

Figure 12:
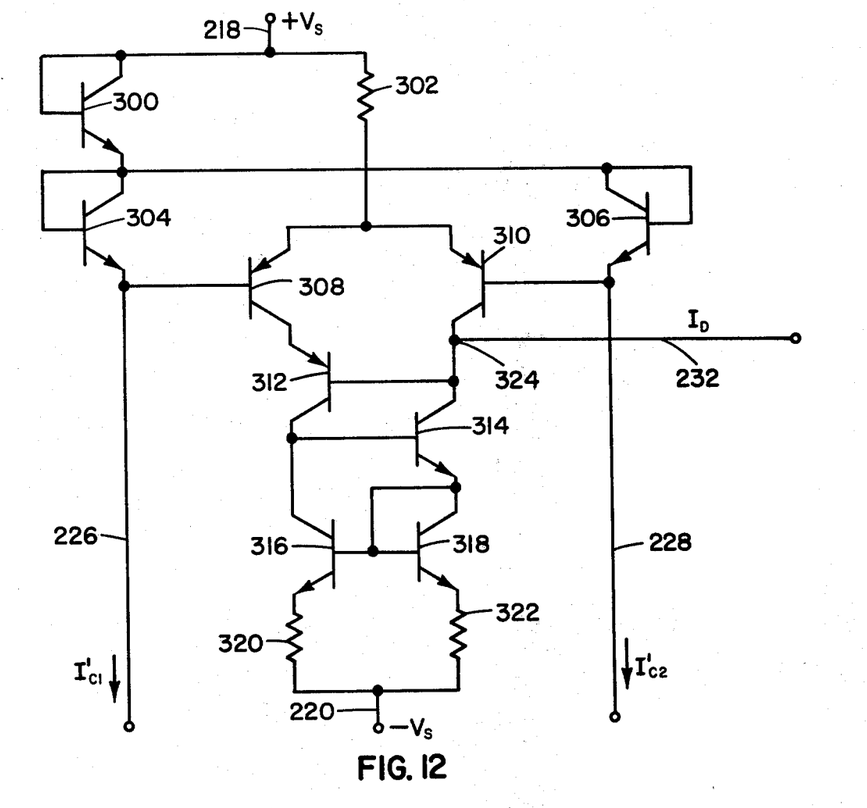
FIG. 12 is a schematic diagram of the differential detector circuit in the block diagram of FIG. 9.

In FIG. 12 the positive supply voltage $+V_S$ is applied to the differential detector circuit 230 over line 218 to both a transistor 300 and a bias resistor 302. The transistor 300 essentially serves as a diode permitting current to flow from the emitter of transistor 300 to a current amplifier composed of transistor 304, 306, 308 and 210. The current amplifier defined by these transistors serves to provide a current source for the detector driver circuit 204 of FIG. 10 wherein the gain of this current amplifier can be adjusted by varying the value of the bias resistor 302. Thus, the gain of the differential detector circuit 230 can be adjusted to reflect the particular mechanical dynamics of the accelerometer 10 or for the particular application for which the accelerometer is to be used. An active load comprised of transistors 312, 314, 316, 318 and resistors 320 and 322 also serves as a current mirror wherein the collector current of transistor 314 is approximately equal to the collector current of transistor 308. The output current $I_D$ on line 232 is proportional to the difference in the currents $I'_{C1}$ and $I'_{C2}$ as a result of the following relationships. The collector current $I_{C308}$ of transistor 308 is equal to:

$$I_{C308} = KI'_{C1}$$

where K is the amplifier current gain as determined by resistor 302. By the same token, the collector current $I_{C310}$ of transistor 310 is equal to:

$$I_{C310} = KI'_{C2}$$

As a result, the collector current $I_{C314}$ for transistor 314 will be equal to the relationships:

$$I_{C314} = I_{C308} = KI'_{C1}$$

Therefore, at the node 324 in the circuit of FIG. 12, the following current relationships are present:

$$I_D = I_{C310} + I_{C308}$$

$$I_D = K(I'_{C2} - I'_{C1})$$

In summary, therefore, the output current $I_D$ on line 232 will be proportional to the differences between the currents $I'_{C1}$ and $I'_{C2}$ where K represents the gain of the system. This type of detector circuit also has the very significant advantage in that it permits the measurement of differences between capacitances of the capacitors C1 and C2 on the order of the thousandth of a picofarad, thereby permitting the use of very small capacitor plates 18 and 20. The measurement of such small capacitants has the further advantage of detecting very slight deflections of the pendulum 26, thus improving the linearity and accuracy of the accelerometer 10.

After passing through the low pass filter 234 of FIG. 9 to filter out the 10 kilohertz to 1 megahertz carrier frequency generated by the saw-tooth oscillator 216, the output current $I_D$ is applied to the positive terminal of the operational amplifier 238. The output of the operational amplifier 238 $V_D$ on line 240 is then applied to a voltage converter circuit 244 indicated within the dashed lines 244 in the schematic of FIG. 13. When the output voltage $V_D$ is positive, a transistor 326 having its base connected to line 240 is placed in a conducting state. Conversely, when $V_D$ is negative, a second transistor, 328, having its base connected to line 240 through diodes 330 and 332 is in a conducting state. A current source 333 by means of current $I_S$ serves to keep the diodes 330 and 332 forward biased. When ransistor 326 is in a conducting state, feedback current $I_F$ will flow on line 246 from the output drive circuit 212 through the collector and emitter of transistor 326 to the line 252. Likewise, when transistor 328 is in a conducting state, feedback current $I_F$ will flow to the output drive circuit 212 on line 248 through the emitter and collector of trnsistor 328 from line 252. In either case, the feedback current $I_F$ will be proportional to the value of the voltage $V_D$.

Figure 13:
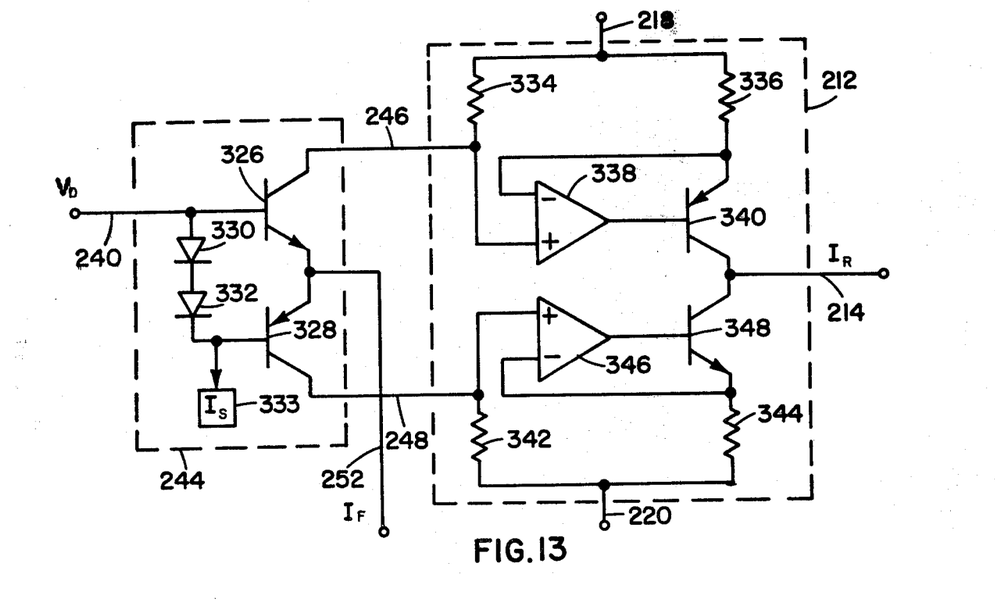
FIG. 13 is a schematic diagram of the voltage current converter circuit and the output driver circuit in the block diagram of FIG. 9.

The output drive circuit indicated by the dashed lines 212 in FIG. 13, is essentially comprised of two current amplifiers. The first current amplifier includes resistors 334 and 336, operational amplifier 338 and transistor 340. The second current amplifier consists of resistors 342 and 344, operational amplifier 346 and transistor 348. The first current ampllifier will react to the voltage across the resistor 334 by producing an equal voltage across 336 as a result of the operation of the operational amplifier 338. The output of the operational amplifier 338 is connected to the base of transistor 340 and will drive the transistor 340 until the current through resistor 336 produces a voltage that is equal to the voltage across resistor 334. It is therefore the relationship between the resistor value 334 and 336 which determines the gain of the current amplifier and thus the value of the restoring current $I_F$. The second current amplifier operates in exactly the same manner wherein the operational amplifier 346 causes the transistor 348 to conduct enough current to equalize the voltages across resistors 342 and 344. As a result, when transistor 326 of the voltage current converter 244 is in a conducting state, the feedback current $I_F$ will be equal to:

$$I_F = R_{336}/R_{334}I_R$$

and similarly, when the transistor 328 is in a conducting state, the feedback current $I_F$ will flow in the opposite direction and have a value equal to:

$$I_F = R_{344}/R_{342}I_R$$

Thus, the general relationship between the restoring current $I_R$ and the feedback current $I_F$ is:

$$I_F = R_{336}/R_{334}I_R \text{ or } R_{334}/R_{342}I_R$$

depending upon the polarity of the $V_D$ signal. Since the feedback current $I_F$ applied to the servo compensation network 250 is related to the restoring current $I_R$ by the alternative ratios of $R_{336}/R_{334}$ and $R_{334}/R_{342}$, the values of these resistors must be selected so as to achieve the greatest possible balance, otherwise, there may be distortion or other errors in the system output. Therefore, it is considered preferable not to include the resistors 334, 336, 342 and 344 within the integrated circuit as shown at 44 of FIG. 1 so that their values can more easily be adjusted and thereby facilitating the calibration of the accelerometer prior to assembly.

Figure 14:
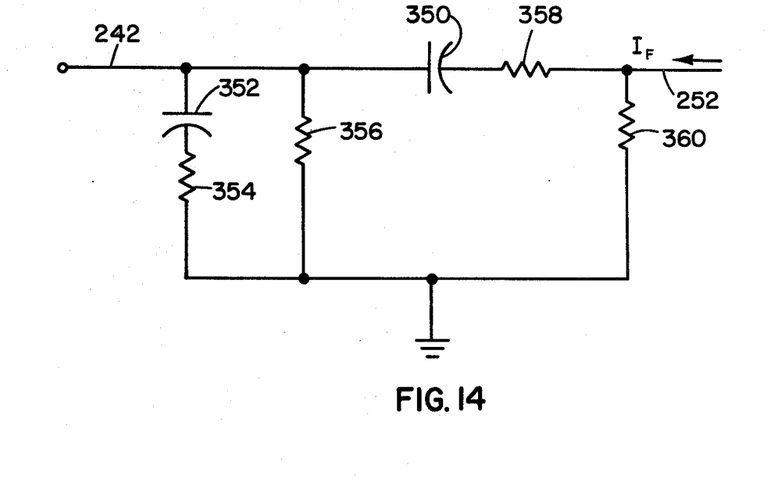
FIG. 14 is a schematic diagram of the servo compensation network in the block diagram of FIG. 9.

In FIG. 14 of the drawings is illustrated a schematic diagram of the servo compensation network 250. The circuit of FIG. 14, as previously indicated, is essentially a band pass filter wherein a feedback signal $I_F$ of relatively low frequency is not transmitted to the negative terminal of the operational amplifier 238 over line 242 and similarly, an $I_F$ signal of very high frequency is for the most part not transmitted to line 242. A capacitor 350 effectively prevents a DC, $I_F$ signal from reaching the negative terminal of the operational amplifier 238, therefore resulting in an essentially infinite gain by the operational amplifier 238 under DC conditions. By the same token, a capacitor 352 cooperating with resistors 354, 356, 358 and 360 will permit most of the high frequency $I_F$ signal to be transmitted to ground, thus providing the operational amplifier 238 with a relatively high gain. In the midband frequencies where, for example, the acceleration signal being applied to the accelerometer 10 is approximately equal to the natural frequency of the pendulum 26, the servo compensation network will permit a portion of the feedback signal $I_F$ from being transmitted to the negative terminal of the operational amplifier 238, thereby serving to reduce the gain of the servo loop. As a result, by adjusting the values of the various components in the serve compensation network 250, the frequency response of the serve system with respect to gain can be adjusted to reflect the dynamics of the mechanical components of the accelerometer 10 and the particular application for which the accelerometer is to be used. In addition, the resistor 360 of the servo compensating network 250 cooperates with the various elements of the voltage to current converter 244 and the output drive circuit 212 to generate a value of the feedback current $I_F$ that is proportional to the ratio of $V_D/R_{360}$.

We claim:

1. An accelerometer comprising:
   a housing;
   a pair of spaced parallel capacitive plates secured within said housing;
   a pendulum including a beam member and a paddle attached to one end of said beam member wherein said paddle is located in a generally spaced parallel position between said plates;
   an axle secured transversely to the longitudinal axis of said pendulum;
   a support frame secured within said housing; and
   an axle support structure secured to said support frame for rotatably supporting said axle wherein said axle support structure includes a first and a second bearing for receiving and rotatably supporting each end of said axle, a first flexure member secured at each end to said support frame for supporting said first bearing and means for supporting said second bearing wherein said axle support structure additionally includes means for adjusting pressure of said bearings on said axle.

2. The accelerometer of claim 1 wherein said second support means includes direct attachment of said second bearing to said support frame.

3. The accelerometer of claim 1 wherein each end of said axle includes a jeweled pivot.

4. The accelerometer of claim 1 wherein said adjusting means includes a spring element interposed between one of said ends of said first flexure and said support frame.

5. The accelerometer of claim 4 wherein said spring element is integral with one end of said first flexure.

6. The accelerometer of claim 1 wherein said adjusting means includes a threaded portion of said support frame and an adjusting screw threadably engaged with said threaded portion wherein one end of said adjusting screw abuts said first flexure.

7. The accelerometer of claim 1 wherein said first flexure is configured with at least one slot.

8. The accelerometer of claim 1 wherein said means for supporting said second bearing includes a second flexure secured at each end to said support frame.

9. The accelerometer of claim 8 wherein said axle support structure additionally includes means for adjusting the pressure of said bearings on said axle.

10. The accelerometer of claim 9 wherein said adjusting means includes at least one spring element interposed between at least one end of said flexures and said support frame.

11. The accelerometer of claim 10 wherein said adjusting means includes a threaded portion of said support frame and an adjusting screw threadably engaged with said threaded portion wherein one end of said adjusting screw abuts one of said flexures.

12. The accelerometer of claim 11 wherein said flexures are configured with two U-shaped slots.

13. The accelerometer of claim 11 wherein each flexure is configured with at least one rectangular slot.

14. The accelerometer of claim 11 wherein each of said flexures is configured with at least one pair of slots wherein the first slot of each of said pairs of slots extends in a perpendicular direction from one side of the flexure past the longitudinal axis of the flexure and the second slot extends in a perpendicular direction from the other side of the flexure past the longitudinal axis of the flexure.

15. The accelerometer of claim 9 wherein said flextures are configured with at least one slot.

16. A servoed accelerometer comprising:
a housing;
a pair of spaced parallel capacitive plates secured within said housing;
a pendulum including a paddle at one end wherein said paddle is located in a generally spaced parallel position between said plates;
an axle secured transversely to the longitudinal axis of said pendulum;
a pair of flexures wherein each end of each of said flexures is secured within said housing so that said flexures are located generally parallel to and on either side of said pendulum;
a pair of bearings, secured on each of said flexures, configured to receive and rotatably support each end of said axle;
a first adjusting means including a threaded support portion secured to said housing alongside a first of said flexure members are an adjusting screw threadably engaged with said adjustable support portion and having one end in an abuttable relationship with said first flexure for adjusting the pressure of said bearing on said axle; and
a second adjusting means including a threaded support portion secured to said housing alongside a second of said flexure members and an adjusting screw threadably engaged with said support portion and having one end in an abuttable relationship with said second flexure for adjusting the pressure of said bearings on said axle.

17. The accelerometer of claim 16 wherein each of said flexures is configured with at least one slot.

18. The accelerometer of claim 17 wherein each end of said axle includes a jeweled pivot point.

19. The accelerometer of claim 16 wherein each of said flexures is configured with a U-shaped slot on each side of the point on said flexure where said adjusting screw abuts the flexure.

20. The accelerometer of claim 16 wherein each of said flexures is configured with at least one slot on each side of the point where said adjusting screw abuts the flexure wherein said slots are perpendicular to the longitudinal axis of the flexures.

21. The accelerometer of claim 20 wherein there are two of said slots on each side of said abutment point and wherein a first of said slots extends from one side of the flexure past the longitudinal axis of the flexure and a second of said slots extends from the other side of the flexure past the logitudinal axis of the flexure.

22. The accelerometer of claim 16 wherein each of said flexures is configured with a rectangular slot on each side of the point on which said adjusting screw abuts the flexure.

23. An accelerometer comprising:
a housing;
a pair of spaced parallel capacitive plates secured within said housing;
a pendulum including a beam member and a paddle attached to one end of said beam member wherein said paddle is located in a generally spaced parallel position between said plates;
an axle secured transversely to the longitudinal axis of said pendulum;
support frame secured within said housing; and
an axle support structures secured to said support frame for rotatably supporting said axle wherein said axle support structure includes a first and a second bearing for receiving and rotatably supporting each end of said axle, a first flexure member secured at each end to said support frame for supporting sid first bearing wherein said first flexure includes a cup-shaped spring portion including a plurality of radial slots interposed between one end of said flexure and said support frame effective to permit the adjustment of the pressure of said bearings on said axle and means including a second flexure secured at each end to said support frame for supporting said sceond bearing.

24. An accelerometer comprising:
a housing;
a pair of spaced parallel capacitive plates secured within said housing;
a pendulum including a beam member and a paddle attached to one end of said beam member wherein said paddle is located in a generally spaced parallel position between said plates;
an axle secured transversely to the longitudinal axis of said pendulum;
support frame secured within said housing; and
an axle support structure secured to said support frame for rotatably supporting said axle wherein sid axle support structure includes a first and a second bearing for receiving and rotatably supporting each end of said axle, a first flexure member secured at each end to said support frame for supporting said first bearing wherein said first flexure includes two leafsprings configured out of one end of said first flexure interposed between one end of said first flexure and said support frame effective to permit the adjustment of the pressure of said bearings on said axle and means including a second flexure secured at each end to said support frame of supporting said second bearing.

25. An accelerometer comprising:
a housing;
a pair of spaced parallel capacitive plates secured within said housing;
a pendulum including a beam member and a paddle attached to one end of said beam member wherein said paddle is located in a generally spaced parallel position between said plates;
an axle secured transversely to the longitudinal axis of said pendulum;
a support frame secured within said housing; and
an axle support structure secured to said support frame for rotatably supporting said axle wherein said axle support structure includes a first and a second bearing for receiving and rotatably supporting each end of said axle, a first flexure member secured at each end to said support frame for supporting said first bearing whrein said first flexure includes two spring members configured out of said end of the flexure wherein said spring members extend in a curve 180° from the plane of the flexure araound into a parallel relationship with said first flexure, interposed between one end of said first flexure effective to permit the adjustment of the pressure of said bearings on said axle and means including a second flexure secured at each end to said support frame for supporting said second bearing.

26. An accelerometer comprising:
   a housing;
   a pair of spaced parallel capacitive plates secured within said housing;
   a pendulum including a beam member and a paddle attached to one end of said beam member wherein said paddle is located in a generally spaced parallel position between said plates;
   an axle secured transversely to the longitudinal axis of said pendulum;
   a support frame secured within said housing; and
   an axle support structure secured to said support frame for rotatably supporting said axle wherein said axle support structure includes a first and a second bearing for receiving and rotatably supporting each end of said axle, a first flexure member secured at each end to said support frame for supporting said first bearing and a second flexure secured at each end to said support frame for supporting said second bearing and means for adjusting the pressure of said bearings on said axle wherein said adjusting means includes a threaded portion of said support frame and a adjusting screw threadably engaged with said threaded portion wherein one end of said adjusting screw abuts one of said flexures.

27. The accelerometer of claim 26 wherein said flexures are configured with two U-shaped slots.

28. The accelerometer of claim 26 wherein each flexure is configured with at least one rectangular slot.

29. The accelerometer of claim 32 wherein each of said flexures is configured with at least one pair of slots wherein the first slot of each of said pairs of slots extends in a perpendicular direction from one side of the flexure past the longitudinal axis of the flexure and the second slot entends in a perpendicular direction from the other side of the flexure past the longitudinal axis of the flexure.

30. A servoed accelerometer comprising:
   a housing;
   a pair of spaced parallel capacitive plates secured within said housing; a pendulum including a paddle at one end wherein said paddle is located in a generally spaced parallel position between said plates;
   an axle secured transversely to the longitudinal axis of said pendulum;
   a pair of flexures wherein each end of each of said flexures is secured within said housing so that said flexures are located generally parallel to and on either side of said pendulum;
   a pair of bearings, secured on each of said flexures, configured to receive and rotatably support each end of said axle;
   a first adjusting means including a threaded support portion secured to said housing alongside a first of said flexure members and an adjusting screw threadeably engaged with said adjustable support portion and having on end in an abuttable relationship with said first flexure for adjusting the pressure of said bearings on said axle; and
   a second adjusting means inclusing a threaded support portion secured to said housing alongside a second of said flexure members and an adjusting screw threadably engaged with said support portion and having one end in an abuttable relationship with said second flexure for adjusting the pressure of said bearings on said axle wherein each of said flexures is configured with a U-shaped slot on each side of the point on said flexure where said adjusting screw abuts the flexure.

31. A servoed accelerometer comprising:
   a housing;
   a pair of spaced parallel capacitive plates secured within said housing;
   a pendulum including a paddle at one end wherein said paddle is located in a generally spaced parallel position between said plates;
   an axle secured transversely to the longitudinal axis of said pendulum;
   a pair of flexures wherein each end of each of said flexures is secured within said housing so that said flexures are located generally parallel to and on either side of said pendulum;
   a pair of bearings, secured on each of said flexures, configured to receive and rotatably support each end of said axle;
   a first adjusting means including a threaded support portion secured to said housing alongside a first of said flexure members and an adjusting screw threadably engaged with daid adjustable support portion and having one end in an abuttable relationship with said first flexure for adjusting the pressure of said bearings on said axle; and
   a second adjusting means including a threaded support portion secured to said housing alongside a second of said flexure members and an adjusting screw threadably engaged with said support portion and having one end in an abuttable relationship with said second flexure for adjusting the pressure of said bearings on said axle wherein each of said flexures is configured with at least one slot on each side of the point where said adjusting screw abuts the flexure wherein said slots are perpendicular to the longitudinal axis of the flexures.

32. The accelerometer of claim 31 wherein there are two of said slots on each side of said abutment point and wherein a first of said slots extends from one side of the flexure past the longitudinal axis of the flexure and a second of said slots extends from the other side of the flexure past the longitudinal axis of the flexure.

33. A servoed accelerometer comprising:
   a housing;
   a pair of spaced parallel capacitive plates secured within said housing;
   a pendulum including a paddle at one end wherein said paddle is located in a generally spaced parallel position between said plates;
   an axle secured transversely to the longitudinal axis of said pendulum;
   a pair of flexures wherein each end of each of said flexures is secured rotatably said housing so that said flexures are located generally parallel to and on either side of said pendulum;
   a pair of bearings, secured on each of said flexures, configured to receive and rotatbly support each end of said axle;
   a first adjusting means including a threaded support portion secured to said housing alongside a first of said flexure members and an adjusting screw threadably engaged with said adjustable support portion and having one end in an abuttment relationship with said first flexure for adjusting the pressure of said bearings on said axle; and a second adjusting means including a threaded support portion secured to said housing alongside a second of said flexure members and an adjusting screw threadably engaged with said support portion and having one end in an abuttment relationship with said second flexure for adjusting the pressure of said bearings on said axle wherein each of said flexures is configured with a rectangular slot on each side of the point on which said adjusting screw abuts the flexure.

* * * * *